US012192553B1

(12) United States Patent
Vasquez-Sierra et al.

(10) Patent No.: US 12,192,553 B1
(45) Date of Patent: Jan. 7, 2025

(54) CONTENT DELIVERY OPTIMIZATION BASED ON PREDICTED EFFECTIVENESS OF LINEAR CONTENT SCHEDULE

(71) Applicant: ROKU, INC., San Jose, CA (US)

(72) Inventors: Ricardo Vasquez-Sierra, San Jose, CA (US); Thomas Musser, Somerville, MA (US); Mithal Kothari, San Jose, CA (US); Vinay Shetty, Santa Clara, CA (US); Bhaskar Parvathaneni, Cupertino, CA (US); Soudipta Das, San Jose, CA (US); Scott Huang, New York, NY (US); Varun Himamshu, Melrose, MA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/368,793

(22) Filed: Sep. 15, 2023

(51) Int. Cl.
*H04N 21/262* (2011.01)
*H04N 21/234* (2011.01)
*H04N 21/81* (2011.01)

(52) U.S. Cl.
CPC . *H04N 21/26208* (2013.01); *H04N 21/23424* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 9,501,783 | B2 * | 11/2016 | Hood | H04N 21/44204 |
| 10,445,766 | B1 * | 10/2019 | Barbier | H04N 21/2407 |
| 11,265,602 | B2 * | 3/2022 | Malhotra | H04N 21/44204 |
| 11,336,940 | B1 * | 5/2022 | Pinkney | H04N 21/26241 |
| 2009/0187932 | A1 * | 7/2009 | Rathburn | G06Q 30/0246 725/9 |
| 2012/0253922 | A1 * | 10/2012 | Baluja | H04N 21/812 705/14.42 |
| 2013/0205339 | A1 * | 8/2013 | Haberman | H04N 21/25883 725/35 |
| 2013/0339126 | A1 * | 12/2013 | Cui | G06Q 30/02 705/14.41 |
| 2014/0100944 | A1 * | 4/2014 | Zhu | G06Q 30/0275 705/14.71 |
| 2014/0196081 | A1 * | 7/2014 | Emans | H04N 21/2542 725/32 |
| 2017/0034594 | A1 * | 2/2017 | Francis | H04N 21/23424 |
| 2018/0189821 | A1 * | 7/2018 | Masson | G06Q 30/0246 |
| 2019/0104343 | A1 * | 4/2019 | Tsivin | H04N 21/454 |
| 2020/0245035 | A1 * | 7/2020 | Sandholm | H04N 21/2668 |
| 2022/0201350 | A1 * | 6/2022 | Carbajal Orozco | H04N 21/26208 |

* cited by examiner

*Primary Examiner* — Alexander Q Huerta

(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for determining an number of slots for achieving a desired reach specified in a media content delivery schedule. The system, apparatus, article of manufacture, method, and/or computer program product aspects is designed with a simulation framework tuned to predict an estimate the needed number of slots based on a reach specified in the delivery schedule.

20 Claims, 8 Drawing Sheets

CONTENT DELIVERY OPTIMIZATION BASED ON PREDICTED EFFECTIVENESS OF LINEAR CONTENT SCHEDULE

FIELD

This disclosure is generally directed to optimizing the delivery of content based on the predicted effectiveness of a content schedule.

SUMMARY

Provided herein are system, apparatus, article of manufacture, method and/or computer program product embodiments, and/or combinations and sub-combinations thereof, for improved linear content scheduling based on machine learning and historical data to improve the reach and effectiveness of linear content delivery. In some embodiments, a linear reach forecaster utilizes a relationship model to process a linear content schedule that provides a schedule for delivering linear content to one or more devices in one or more households. The content schedule comprises a target audience and a target set of impressions for supplemental content within the linear content. One embodiment of a target set of impressions is gross ratings points (GRP) which reflects a number of impressions that content may deliver within a universe of viewers and one embodiment of supplemental content is advertising content. Accordingly, a content schedule may be a schedule for achieving a target number of impressions for the advertisements within linear content.

In some embodiments, the content schedule is further associated with a content provider that provides the supplemental content and that selects the target audience for its content, a network channel on which the linear content is to be delivered, and a daypart reflecting when the linear content is to be delivered. In some embodiments, the linear reach forecaster may output a predicted reach of the content schedule, a number of delivery slots for the target set of impressions, the network channel, and the daypart. In some embodiments, the number of slots within a schedule may then be utilized to adjust or otherwise make decisions on how to distribute content within the schedule. One embodiment of the number of slots includes providing an estimated number of slots to achieve the target impression.

In some embodiments, linear reach forecaster may generate the number of delivery slots for the target impression based on one or more steps involving machine learning models. For example, linear reach forecaster may generate a reach model that reflects a relationship between an estimated reach of the supplemental content and a range of spots that the supplemental content is scheduled to run. The reach model may be based on estimating a reach probability of the supplemental content for the network channel and the daypart based on historical performance data associated with the network channel and the daypart and generating an estimated reach of the supplemental content based on the reach probability and a range of spots available for the network channel and the daypart. A machine learning model may then be used to further determine the number of delivery slots for the target set of impressions, the network channel, and the daypart, based on the relationship between the estimated reach of the supplemental content and the range of spots.

Linear reach forecaster may generate an estimated reach based on the number of delivery slots and dayparts. In some embodiments, the estimated reach may be optimized by changing the target impression in the linear content schedule. In some embodiments, the estimated reach may be used to generate an updated linear content schedule and linear content may be delivered via the network channel to the media device associated with the household based on the updated linear content schedule.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
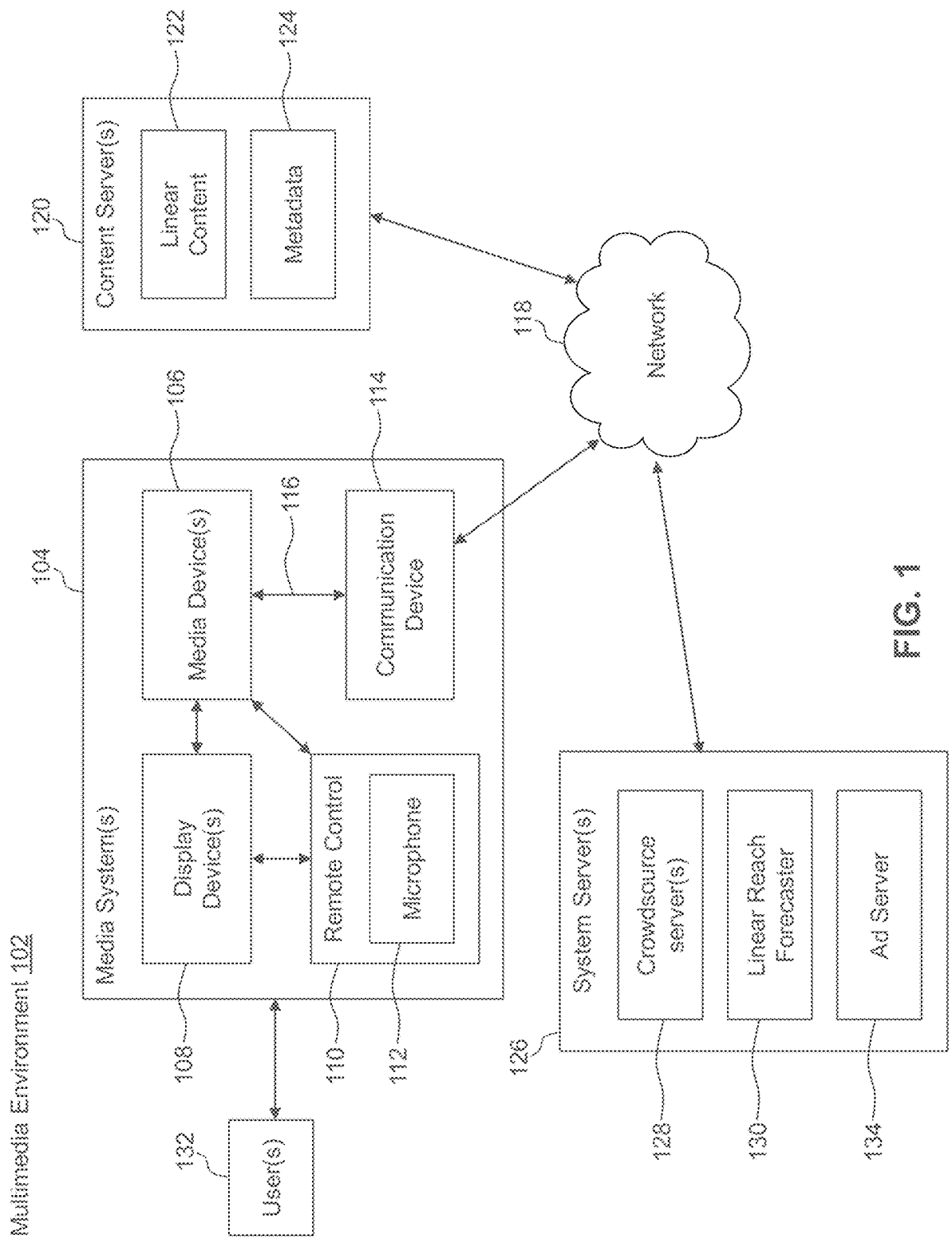
FIG. 1 illustrates a block diagram of a multimedia environment, according to some embodiments.

Linear content schedules play a role in the distribution of linear content. Linear content provides different challenges to content providers, such as advertisers, who seek to maximize the effectiveness of content campaigns by reaching the desired target audience and optimizing the allocation of content within the linear content schedule. In some aspects, linear content scheduling are adjusted manually and lack predictive capabilities, which can lead to suboptimal utilization of advertising resources.

Linear content delivery involves distribution of content on a schedule or sequence which contrasts with over-the-top (OTT) delivery (or non-linear) which provides content in a streaming, per user-request fashion. Linear content may include primary content and supplemental content that are provided on a scheduled basis. This prevents the ability to dynamically adjust or adapt content delivery based on viewing conditions; linear content is generally locked ahead of time and is delivered on schedule irrespective of viewer behavior. Current delivery mechanisms for linear content are therefore reactive and rely on evaluating user reach after the content has been delivered to user devices. This is a technological challenge involving the delivery of content to millions of user devices. This challenge is compounded by the difficulty of estimating the number of users that will be reached before linear content is actually provided to user devices.

Linear content delivery still remains a relevant technology amidst the on-going popularity of streaming content services. In contrast to on-demand content, linear content refers to content that is provided at within specific scheduling blocks and via specific channels Examples of linear content include content delivered via satellite and cable by a cable channel, such as cable television, or any content is delivered via a specific timeline or schedule. In some embodiments, linear content may also be delivered via streaming devices. For example, streaming devices may offer applications that provide access to linear channels that deliver linear content. In other words, streaming devices may be capable of providing both streaming content and linear content via separate applications installed on the streaming devices. There are several parameters to consider for the delivery of linear content: gross rating points (GRPs), target audience metrics, daypart, and network channel.

GRPs are a metric that reflects the overall number of impressions for a target audience of a content campaign (e.g., advertising). In some embodiments, a GRP calculation involve two measures: reach and frequency. Reach refers to the total number or percentage of individuals or households within a target audience exposed to a particular content campaign, such as when the content is displayed in a screen of the household. Frequency represents the average number of times an individual or household within the target audience is exposed to the same content campaign. In some embodiments, GRPs may be obtained by multiplying the reach of the campaign by its frequency. GRPs therefore provide a quantitative measure to evaluate and compare the potential impact of different campaigns or media placements within linear content.

In other embodiments, GRPs may be calculated based on impressions and an estimated total universe of viewers within a particular region (e.g., U.S.). Impressions refer to the number of times content (e.g., an advertisement) is viewed by a target audience. An impression occurs when a household is exposed to an advertising message or campaign, such as when the content is displayed in a screen of the household. Each instance of exposure to the advertisement is counted as one impression. Impressions provide a quantitative measure of the exposure of content that is provided as part of linear content delivery. For example, 100 impressions may reflect a single person being exposed 100 times to the linear content or 100 people being exposed a single time each to the linear content.

Linear content is provided via a linear content schedule, which is a predetermined plan of programming content that is broadcasted or distributed in a linear fashion by following a specific timeline or sequence. A linear content schedule outlines the lineup of content that are scheduled to be played on a particular network or channel over a designated period. A linear content schedule may be organized based on network channels that distribute content to a specific audience. A schedule may be divided into a number of segments with different content being inserted into each segment.

Segments of a linear content schedule may be grouped based on daypart, which represent scheduling blocks within the day during which linear content is delivered. Examples of dayparts include morning, daytime, prime-time, and late night and each of these day parts may represent a certain block of hours.

Provided herein are improved linear content scheduling based on machine learning and historical data to improve the reach and effectiveness of content delivery. Provided herein are system, apparatus, device, method and/or computer program product embodiments, and/or combinations and sub-combinations thereof, for optimizing the delivery of linear content using predictive methods for estimating the reach of a proposed linear content schedule. As used in the specification and the appended claims, "content items" may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, graphics, or the like which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether the format is presently known or developed in the future. The content items described herein may be electronic representations of music, spoken words, or other audio, which may be but is not limited to data files adhering to the MPEG1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format, or some other format configured to store electronic audio whether the format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (PSD) format or some other format for electronically storing text, graphics and/or other information whether the format is presently known or developed in the future. Content items may be any combination of the above-described formats.

The technological problem solved by embodiments of this disclosure is how to improve the delivery linear content by maximizing the number of households that are reached for an optimized linear content schedule. The embodiments of this disclosure provide a technological solution to this problem by employing machine learning models to predict the effectiveness of a proposed linear content schedule and updating the linear content schedule based on the predicted effectiveness to create an optimized linear content schedule.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 including a linear reach forecaster for generating a predicted reach of a content delivery schedule. The predicted reach which is the predicted number of people that will likely be exposed to a spot in a content delivery schedule. The predicted reach may be used to generate optimized content delivery schedules for delivering content, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to delivery and presentation of linear content media, which may refer to content that is delivered in a linear fashion, following a predefined timeline or sequence. This may include delivering content on a specific channel and at a scheduled time. Linear content schedules may include timeslots, or spots, into which content is inserted. Content may include primary content and supplemental content. Primary content may include television program content and movie content while supplemental content may include any content associated with or generally in addition to the primary content such as advertisements, interactive content, videos, images, or infographic, etc. However, this disclosure is applicable to any type of media (instead of or in addition to linear content media) that can be implemented with embedded supplemental content, as well as any mechanism, means, protocol, method and/or process for distributing media.

The multimedia environment 102 may include one or more media systems 104. A media system 104 comprises many devices and can be implemented within a single location, or in distributed locations, such as in one or more of a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. For example, there may be one or more display devices 108 of media system 104 with each display device 108 being located in a separate location. User(s) 132 may operate the media system 104 to select and view content, such as linear content 122.

Each media system 104 may include one or more media device(s) 106 each coupled to one or more display device(s) 108. It is noted that terms such as "coupled," "connected to," "attached," "linked," "combined" and similar terms may refer to physical, electrical, magnetic, logical, etc., connections, unless otherwise specified herein.

Media device 106 may be any device that is capable of receiving linear content, such as a streaming media device, a streaming set-top box (STB), cable and satellite STB, a DVD or BLU-RAY device, an audio/video playback device, a cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections. In some embodiments, communication device 114 can be a part of, integrated with, operatively coupled to, and/or connected to a respective media device 106 and/or a respective display device 108.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. When implemented as a smartphone or tablet, operations of the remote control 110 may be provided by a software program installed on the smartphone or tablet that provide a user interface that includes controls of the remote control 110.

The multimedia environment 102 may include a plurality of content server(s) 120 (also called content providers, channels, or sources). Although only one content server 120 is shown in FIG. 1, in practice the multimedia environment 102 may include any number of content server(s) 120. Each content server 120 may be configured to communicate with network 118. Each content server 120 may be configured to communicate with network 118. Content server 120, media device 106, display device 108, may be collectively referred to as a media device, which may be an extension of media system 104. In some embodiments, a media device may include system server 126 as well.

Each content server 120 may store linear content 122 and metadata 124. In some embodiments, content server 120 may be associated with a cable television provider and provide linear content 122 via channels. Linear content 122 may include content that is formatted to be presented as part of a linear content schedule to one or more households. Examples of formatted content include any combination of music, videos, movies, TV programs, multimedia, images, still pictures, text, graphics, gaming applications, advertisements, programming content, public service content, government content, local community content, software, and/or any other content or data objects in electronic form. Linear content 122 may be the source displayed on display device 108.

In some embodiments, metadata 124 comprises data about linear content 122. For example, metadata 124 may include closed captioning data, such as text data, associated with linear content 122. Metadata 124 may further include timeslots that link the closed captioning data to the audio data of linear content 122. The timeslots allow the display of the closed captioning data by display device 108 to be synced with the playback of audio data of linear content 122 such that the text provided by the closed captioning data matches the timeslot when the audio data is played such as by display device 108 or another sound playback device.

Metadata 124 may further include indicating or related to labels of the materials in the linear content 122, writer, director, producer, composer, artist, actor, summary, chapters, production, history, year, trailers, alternate versions, related content, applications, and/or any other information pertaining or relating to the linear content 122. Metadata 124 may also or alternatively include links to any such information pertaining or relating to the linear content 122. Metadata 124 may also or alternatively include one or more indexes of linear content 122, such as but not limited to a trick mode index. In some embodiments, linear content 122 can include a plurality of content items, and each content item can include a plurality of frames having metadata about the corresponding frame.

In some embodiments, metadata 124 may further comprise formatting details about corresponding linear content 122. The formatting details may indicate content duration, content format, and content type, and may be utilized for generating the linear content schedule. For example, some segments of a linear content schedule may be designated for advertising content; in this example, advertisements may be retrieved based on duration, format, and type that matches the particular segment or segments of a content schedule.

In some embodiments, metadata 124 may further include historical viewership data, demographic information, user preferences, and other relevant data points associated with linear content 122. This data can be obtained from various sources, including from automatic content recognition modules installed in media devices (see FIG. 2), television and radio ratings agencies, user watch histories, and surveys.

In some embodiments, metadata 124 may further include automatic content recognition (ACR) data provided by content recognition modules (e.g., content recognition module 216) of media device(s) 106. ACR data may represent the content being provided (via external inputs such as an HDMI port or tuner connection) to media device(s) 106. ACR data is discussed in further detail below with regard to content recognition module 216. Metadata 124 may organize the ACR based on one or more of household, network channel, and daypart.

The multimedia environment 102 may include one or more system server(s) 126. The system server(s) 126 may operate to support the media device(s) 106 from the cloud. It is noted that the structural and functional aspects of the system server(s) 126 may wholly or partially exist in the same or different ones of the system server(s) 126. System server(s) 126 and content server 120 together may be referred to as a media server system. An overall media device may include a media server system and media system 104. In some embodiments, a media device may refer to the overall media device including the media server system and media system 104.

The media device(s) 106 may exist in thousands or millions of media systems 104. Accordingly, the media device(s) 106 may lend themselves to crowdsourcing embodiments and, thus, the system server(s) 126 may include one or more crowdsource servers 128.

For example, using information received from the media device(s) 106 in the thousands and millions of media systems 104, the crowdsource server(s) 128 may identify similarities and overlaps between closed captioning requests received by one or more media devices 106 watching a particular movie. Based on such information, the crowdsource server(s) 128 may identify patterns in the closed captioning requests, such as particular requests occurring at particular portions of the movie (for example, when the soundtrack of the movie is difficult to hear). Based on these identified patterns, crowdsource server(s) may generate commands or suggestions to turn closed captioning off for the particular movie at the particular portions (as determined from the identified patterns). These commands or suggestions may be associated with the movie and stored as metadata (e.g., metadata 124) for the movie so that subsequent requests for the movie may result in downloading the metadata. Playback of the movie may then result in automatically turning on or off the closed captioning or providing the suggestion (so that the user may manually do so) which results in enhancing users' viewing experience at these portions of the movie. In some embodiments, crowdsource server(s) 128 can be located at content server 120. In some embodiments, some part of content server 120 functions can be implemented by system server 126 as well.

As another example, crowdsource server(s) 128 may initiate a watch party between multiple media devices 106, each of which may located at a different physical location and/or connected to different Wi-Fi networks. A watch party may comprise the synchronized playback of content across the multiple media devices 106. Embodiments of the present disclosure may be applied to multiple media devices 106 such that the detection of a trigger by one or more media devices 106 or by system server 126 may result in the content enhancement protocol being executed at the multiple media devices 106. In some embodiments, one media device 106 may be designated as the "host" for the watch party and may be responsible for generating the content enhancement protocol based on a trigger. In some embodiments, the media device 106 may transmit the generated content enhancement protocol to the other media devices that are participating in the watch party so that each media device has the same content enhancement protocol and each media device is responsible for enhancing the presentation of the content in accordance with the protocol. In some embodiments, media device 106 may transmit the content enhancement protocol to system server 126 which may then be responsible for enhancing the presentation of content in accordance with the protocol for each participating media device in the watch party.

System server(s) 126 may also include a linear reach forecaster 130. Linear reach forecaster 130 may be configured to generate an optimized linear content schedule. In some embodiments, linear reach forecaster 130 may receive a proposed linear content schedule, process the proposed linear content schedule to generate a predicted household reach of the proposed schedule, and update segments of the proposed linear content schedule to maximize the reach of content in the schedule. Updating the segments of the proposed linear content schedule may result in the optimized linear content schedule.

In some embodiments, linear reach forecaster 130 may be configured to receive information about content provided to and/or displayed by media device(s) 106. This information may include the content, the day and/or time that the content was displayed by the media device, and other analytics associated with the content. In some embodiments, the content is linear content.

In some embodiments, linear reach forecaster 130 may be configured to provide a simulation framework that emulates a reach response to different levels of content run on a linear channel. Linear reach forecaster 130 may be configured to emulate the reach for different segments in the linear content, such as the primary content (e.g., shows, movies) and the supplemental content (e.g., advertisements, interactive content). In some embodiments, the content are advertisements in ad spots within the linear content and the simulation framework can emulate the reach response for varying amounts of ad spots. The framework may then be tuned based on average historical performance for the particular network channel and/or daypart. The tuned framework may then be used to predict the average response to schedules running on the particular network channel and/or daypart.

In some embodiments, the simulation framework of linear reach forecaster 130 may be implemented with one or more machine learning models for generating an optimized linear content schedule. Linear reach forecaster 130 may include a reach machine learning model for determining a predicted relationship between the number of spots in a proposed linear content schedule and a predicted household reach based on the number of spots Additional inputs to the reach machine learning model may also include each network channel on which the linear content is to be displayed and the daypart when the linear content is to be displayed.

Based on these trained machine learning models, linear reach forecaster 130 may predict viewership and engagement levels, via a predicted reach, to assess the effectiveness of a proposed content schedule. Linear reach forecaster 130 may generate effectiveness scores or rankings for each segment, indicating their potential reach in terms of audience reach and engagement. One example of a content schedule is based on a gross ratings point, or GRP. Such a schedule is termed a GRP schedule and is focused on the distribution of spots for advertisement content within linear content. A GRP schedule is a planned distribution of GRPs across different advertisement placements within linear content. A GRP schedule provides a distribution of spots within the linear content for a particular period (e.g., quarter), network channel, and daypart. Other types of content schedules may be used which may focus on, for example, spots for primary content, interactive content, or other supplemental content that may be allocated within linear content. In some embodiments, a content provider may utilize multiple GRP schedules for each network channel and daypart.

In examples where a content provider is an advertiser, the advertiser may have one GRP schedule for each network channel on which it has purchased GRPs for its advertisements. In embodiments where the linear content includes advertisements, linear reach forecaster 130 may also include a GRP machine learning model for predicting the reach of GRP schedules. The GRP machine learning model may reflect a predicted relationship between GRPs associated with the advertiser and a number of predicted spots to be run to achieve the desired reach for that advertiser on the particular network channel and for that particular daypart.

The predicted reach of the one or more content schedules reflects the households that are likely to be exposed to the content within the one or more content schedules. Exposure may be determined based on whether the content is displayed by one or more media devices in the household. In some embodiments, exposure may be determined based on automatic content recognition modules installed at the one or more media devices. An automatic content recognition module may be configured to detect and record the content displayed by the or more media devices.

Figure 2:
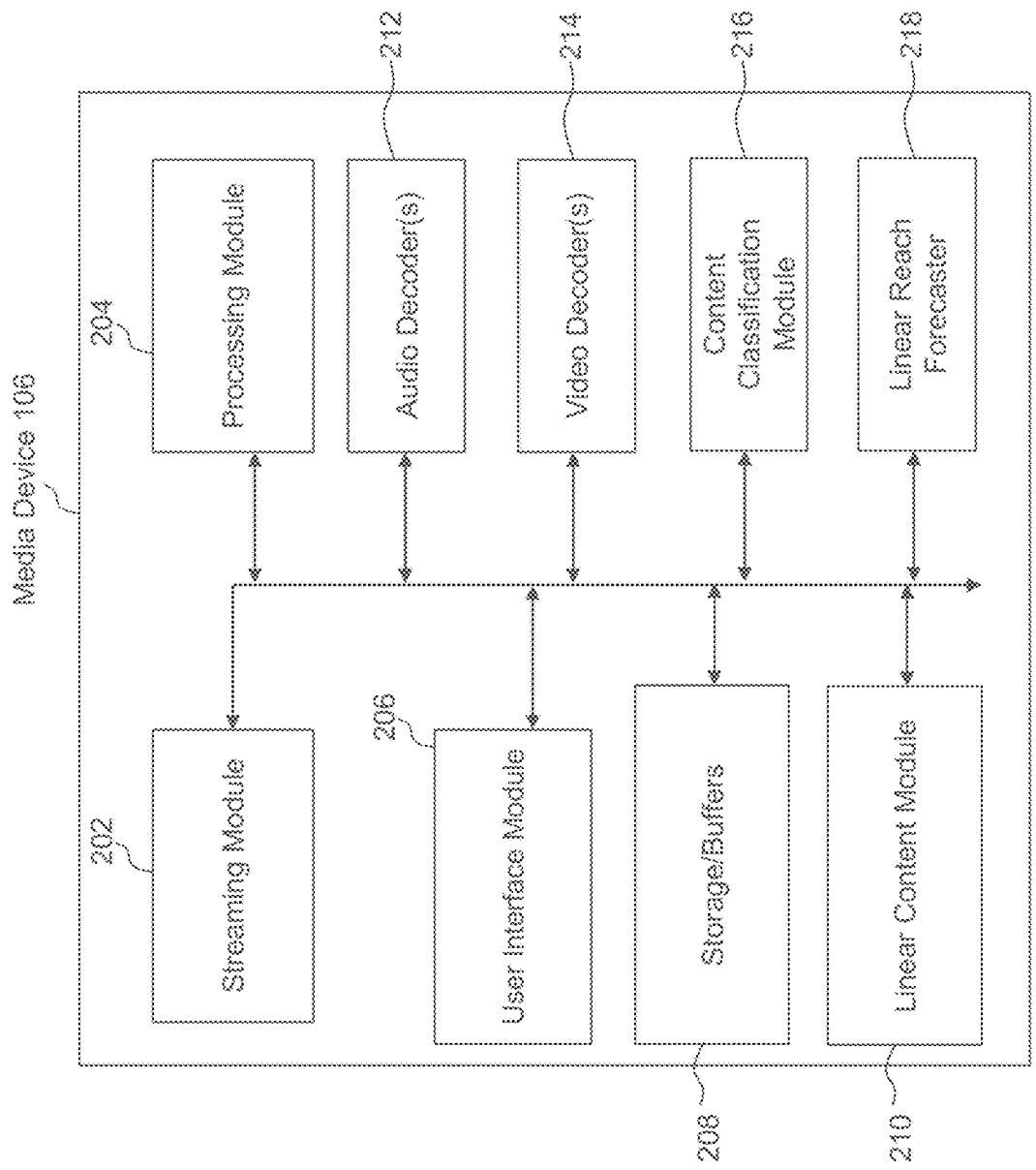
FIG. 2 illustrates a block diagram of a streaming media device, according to some embodiments.

In some embodiments, an optimized linear content schedule may be alternatively or additionally processed and updated based on the predicted reach provided by linear reach forecaster 218 in the media device 106 (see FIG. 2). Linear reach forecasting or modification of content schedules may then be performed at the media device 106, the system server(s) 126, or some combination of both (e.g., where processing may be shared between linear reach forecaster 130 and linear reach forecaster 218).

In some embodiments, linear reach forecaster 130 receives a GRP schedule that indicates the number of GRPs that are allocated to a provider, such as an advertiser. As noted above, GRPs refer to a number of impressions that content is viewed or displayed to a household. In some embodiments, one GRP is the number of impressions equal to 1% of the total universe of households within a region that can be reached. Accordingly, one hundred GRPs reflects a number of gross impressions equal to the total size of the universe (i.e., 100%) within a region. Linear reach forecaster 130 may utilize the tuned simulation framework into a number of spots within the linear content. In some embodiments, the number of spots is for each network channel and/or daypart. Linear reach forecaster 130 may then utilize the calculated number of spots to estimate the reach of those number of spots. This estimated reach reflects a prediction of the effectiveness of the initial GRP schedule.

In some embodiments, the estimated reach may then be utilized to optimize the initial GRP schedule to achieve a desired reach for particular content, such as advertisements in the linear content. For example, ad server 134 may adjust the initial GRP schedule based on the estimated reach to increase or decrease the number of spots of advertisements within the linear content to achieve a desired reach for an advertisement provider within the linear content. Allowing these adjustments to the GRP schedule optimizes the resources of the network channel and content providers who want to effectively maximize the reach of their content.

With respect to FIG. 1, one or more computing devices of the content servers 120 of FIG. 1, the system servers 126 of FIG. 1, or a combination thereof may be used to generate optimized linear content schedules of a proposed linear content schedule based on machine learning models processing GRPs, a proposed number of spots, a predicted number of spots, and predicted reach. The one or more computing devices of the content servers 120, the system servers 126, or a combination thereof may also be used to generated the optimized linear content schedules.

The generation of optimized linear content schedules provides a technical advantage because it helps in improving the functioning of computers and computer networks. By predicting potential reach for the supplemental media content and subsequently the number of spots needed to achieve a desired reach, the optimized linear content schedules can indicate how best to allocate resources to distribute data over a network to achieve the maximum reach for media content, including advertisements. It also saves computing resources because, by knowing how to deliver content over the network to achieve the maximum reach, resources are efficiently used, network traffic is optimized, and overall data flow is improved over the network, while maximizing the number of households that receive the content.

FIG. 2 illustrates a block diagram of an example media device(s) 106, according to some embodiments. Examples of media device(s) 106 include a smart television or a streaming device externally connected to a television. Media device(s) 106 may include a streaming module 202, processing module 204, user interface module 206, storage/buffers 208, linear content module 210, audio decoder 212, video decoder 214, content recognition module 216, and linear reach forecaster 218.

Linear content module 210 may be a module that receives linear content. In an embodiment, media device(s) 106 may be implemented as a television and linear content module 210 may be implemented as an input port, such as an HDMI input, a composite video baseband signal (CVBS) input, or a cable tuner connection, for receiving input signals that includes the linear content. In some embodiments, the linear content is delivered to the media device(s) 106 via an external device connected to the media device(s) 106, such as a server or a set-top box.

Content recognition module 216 may perform automatic object recognition (ACR) of content that is provided to and/or displayed by media device(s) 106. For example, content recognition module 216 may analyze content provided to streaming module 202 (e.g., streaming content) and/or linear content module 210 (e.g., linear content module). In some embodiments, content recognition module 216 recognizes content provided to media device(s) 106 as primary content (e.g., a television show, a movie) or as supplemental content (e.g., an advertisement, interactive content, or content associated with the primary content). In some embodiments, content recognition module 216 may be further configured to tag or otherwise classify recognized content based on content type, such as a television show or a movie.

In some embodiments, content recognition module 216 may further be configured to identify providers associated with the content. For example, content recognition module 216 may identify advertisers associated with advertising content or content providers associated with television shows or movies. In some embodiments, content recognition module 216 may be further configured to correlate the content with the network channel and daypart that the content was displayed by media device(s) 106. Content recognition module 216 may provide any recognized content, providers, and correlated day/time information to linear reach forecaster 218 and/or linear reach forecaster 130. In some embodiments, content recognition module 216 may further determine other metrics associated with content being provided to media device(s) 106 (of one or more households) such as the frequency that content is displayed.

In some embodiments, content recognition module 216 may further be configured to correlate the content detected to linear content schedules to confirm that linear content schedules are providing content to households.

In some embodiments, linear reach forecaster 218 may be configured to operate in a similar manner to linear reach forecaster 130. In some embodiments, linear reach forecaster 218 may be configured to operate instead of and/or in combination with linear reach forecaster 130. Linear reach forecaster 218 may be implemented with one or more machine learning models for generating the optimized linear content schedule. Linear reach forecaster 218 may utilize data provided by content recognition module 216. As one example, linear reach forecaster 218 may input the data provided by content recognition module 216 into a reach machine learning model for determining a predicted relationship between the number of spots in a proposed linear content schedule and a predicted household reach based on the number of spots. Additional inputs to the reach machine learning model may also include each network channel on which the linear content is to be displayed and the daypart when the linear content is to be displayed.

In embodiments where the linear content includes advertisements, linear reach forecaster 218 may also include a GRP machine learning model for determining a predicted relationship between GRPs associated with the advertiser and a number of predicted spots to be run to achieve the desired reach for that advertiser on the particular network channel and for that particular daypart.

In some embodiments, the linear content schedule may be alternatively or additionally processed and generated by linear reach forecaster 218 in the media device 106 (see FIG. 2). Linear reach forecasting or modification of content schedules may then be performed at the media device 106, the system server(s) 126, or some combination of both (e.g., where processing may be shared between linear reach forecaster 130 and linear reach forecaster 218). For example, linear reach forecaster 218 may perform initial steps of generating the optimized delivery schedule, transmit the results of these initial steps to linear reach forecaster 130 for completing the remaining steps and generating the optimized delivery schedule.

Figure 4A:
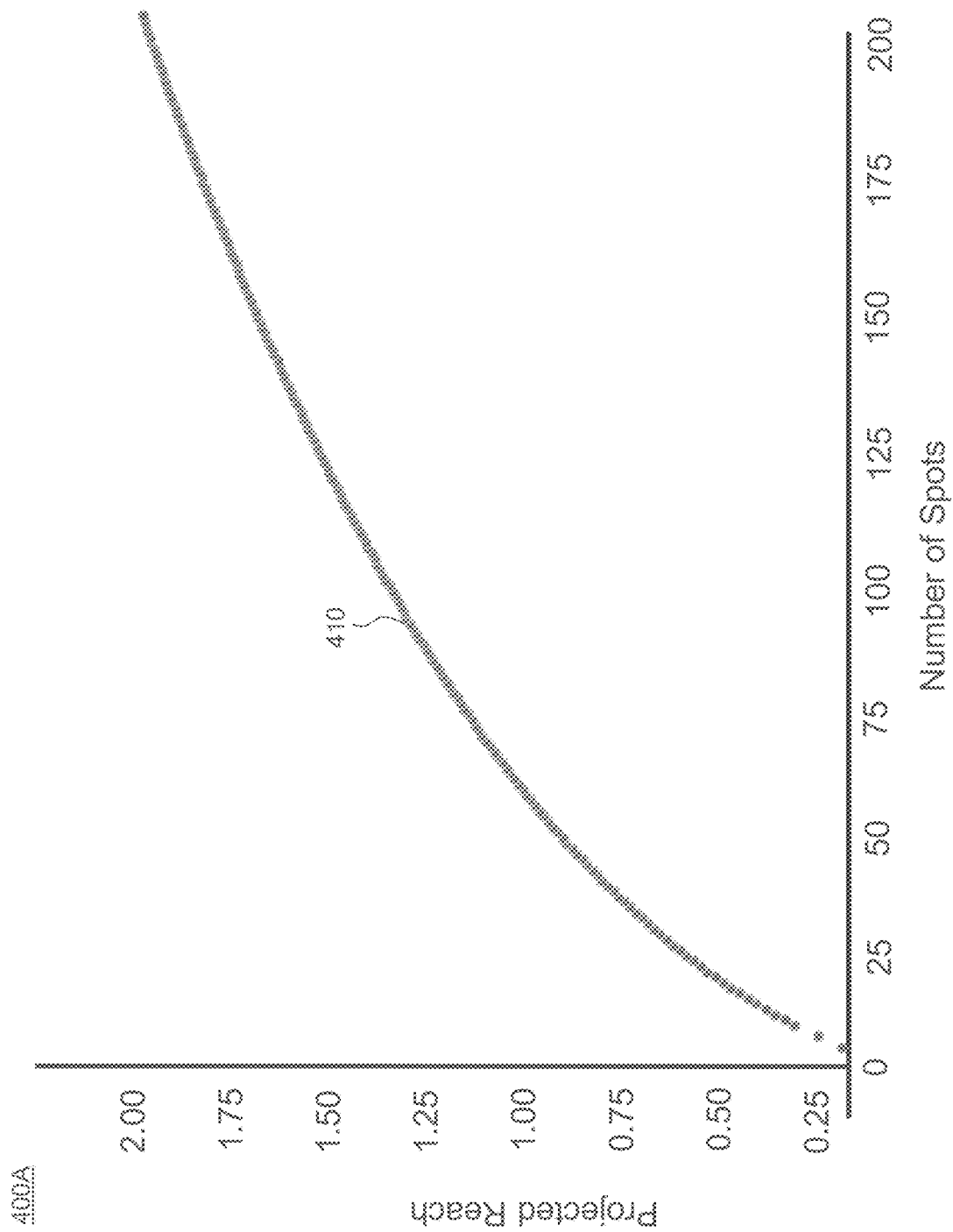
FIG. 4A illustrates an exemplary output of a reach vs. spots model, according to some embodiments.
Figure 4B:
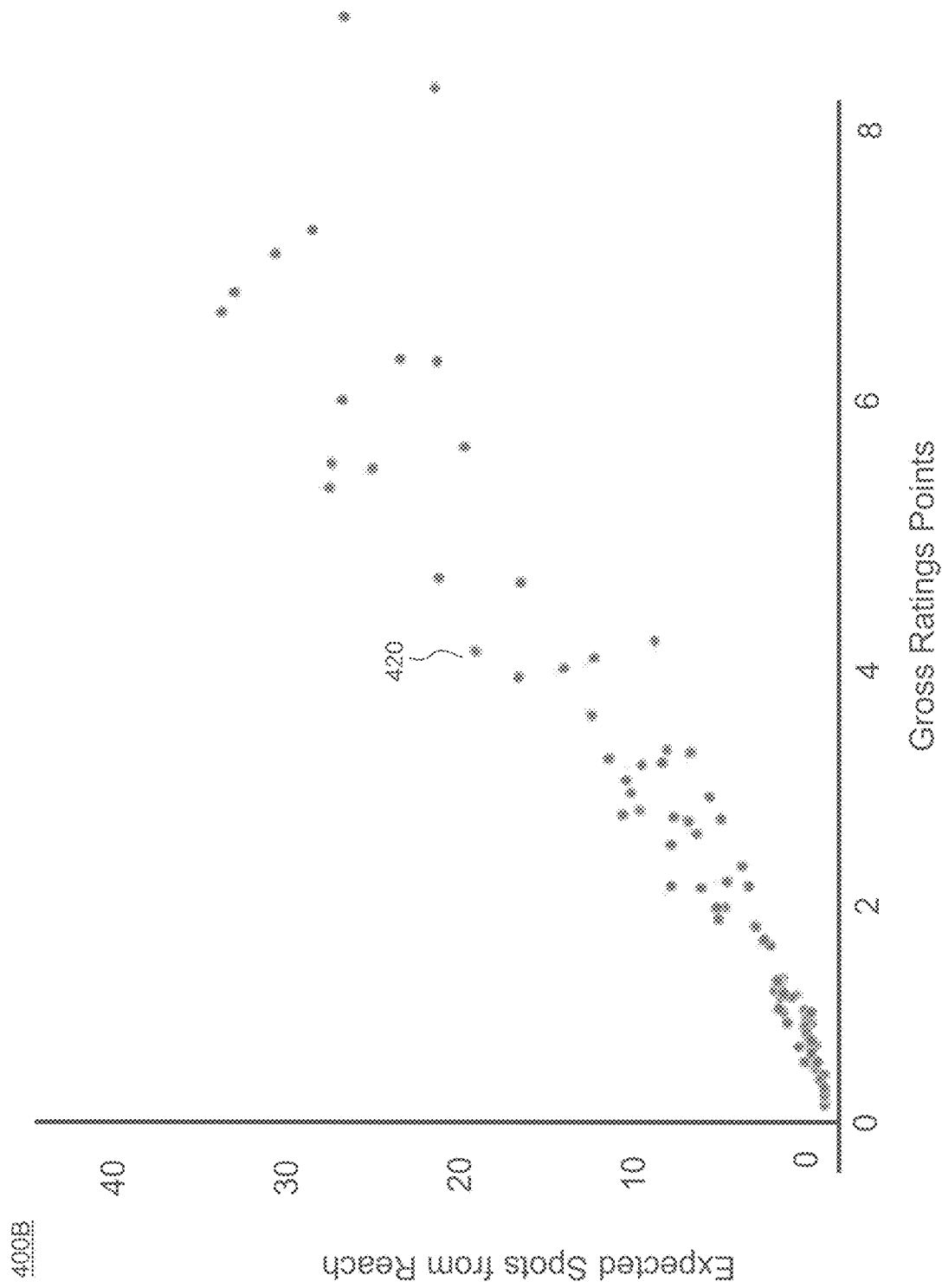
FIG. 4B illustrates an exemplary output of a spots vs. gross ratings points model, according to some embodiments.
Figure 5:
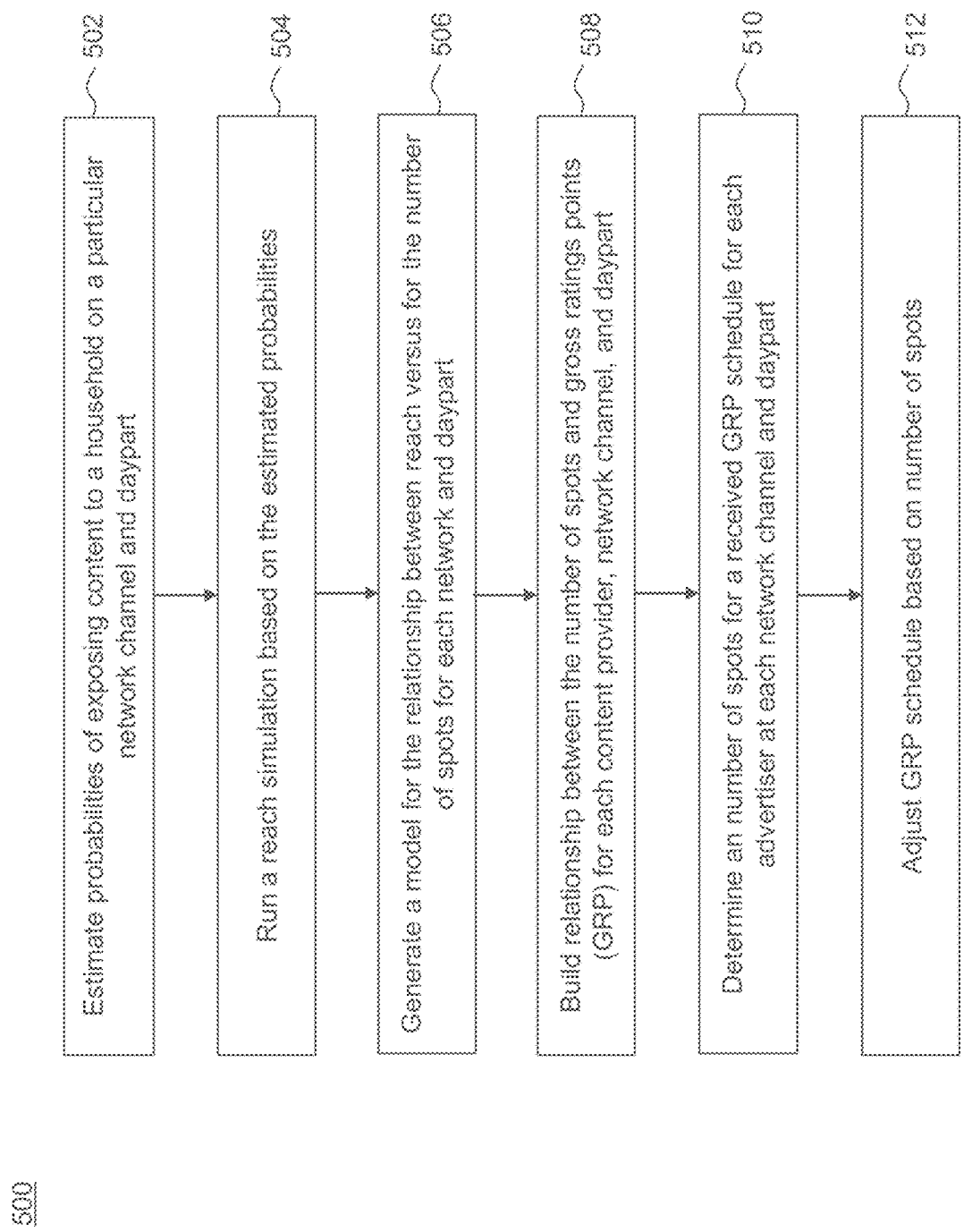
FIG. 5 is a flowchart illustrating a method for generating an optimized deliver schedule, according to some embodiments.

Functions of the linear reach forecaster 218 are discussed in additional detail with regard to FIGS. 3-5.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user(s) 132 may interact with the media device(s) 106 via, for example, the remote control 110. For example, the user(s) may use the remote control 110 to request linear content to be provided to media device(s) 106. For example, user(s) 132 may request linear content via a linear channel at a particular daypart. The requested linear content may be delivered in accordance with an optimized delivery schedule that includes an optimized number of segments of content (e.g., advertisements) for the particular network channel and/or the daypart that the request was made. In some embodiments, the optimized delivery schedule provides an optimized number of ad spots within the linear content.

Exemplary Operation of Linear Reach Forecaster

Figure 3A:
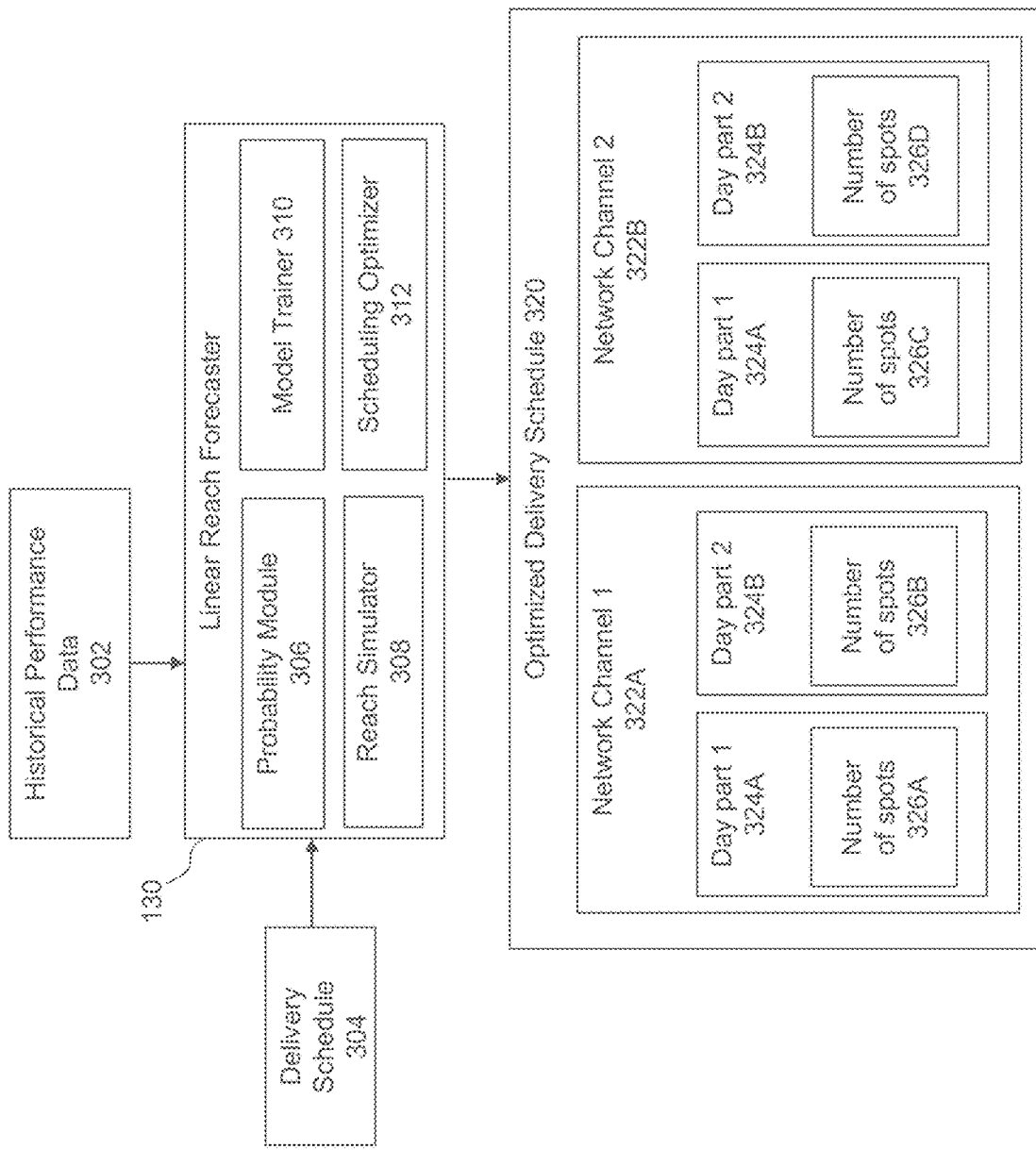
FIG. 3A illustrates a block diagram of exemplary inputs and output of a linear reach forecaster, according to some embodiments.

FIG. 3A illustrates a block diagram of exemplary inputs and outputs of a linear reach forecaster, such as linear reach forecaster 130 and/or linear reach forecaster 218, according to some embodiments. The inputs include historical performance data 302 and a proposed delivery schedule 304, such as a GRP schedule of an advertiser.

Historical performance data 302 may refer to the number of consumed content for a household for a time frame. For example, historical performance data 302 may refer to the number of linear ads a household consumed in a particular quarter. Historical performance data 302 may be segmented based on network channel and/or daypart. For example, historical performance data 302 may include the performance (e.g., reach) of previous content schedules that were run on network channels and/or dayparts. Thus, the simulation framework is tuned based on reaches of prior content delivery schedules which refines the results of the framework so that better projections can be made about the estimated reach of proposed or potential content delivery schedules.

Components of linear reach forecaster 130 include a probability module 306, a reach simulator 308, model trainer 310, and scheduling optimizer 312.

In some embodiments, probability module 306 is configured to estimate the probability of one or more households being exposed to any content on a particular network and a particular daypart. This estimation may be based on historical performance data 302, such as the number of linear content and/or ads that was displayed by media device(s) 106 of an average household (i.e., consumed) for a particular time frame. Examples of time frames include a month (monthly), 3 months (a quarter), 6 months (half), or 12 months (annually).

In some embodiments, this estimation may be calculated based on a ratio of impressions for the particular network channel, daypart, and household over a maximum number of available spots for the particular network channel and daypart. An example ratio is provided below with p reflecting the estimated probability. As noted above, this probability reflects a likelihood that a household is exposed to desired content (e.g., an ad spot) on a particular network channel and daypart.

$$p_{household}^{network,daypart} = \frac{\text{impressions}_{household}^{network,daypart}}{\text{spots}_{max}^{network,daypart}}$$

In some embodiments, the probabilities are associated with a household identifier. The household identifier may further be associated with identifiers of media device(s) 106 that are operating within those households.

In some embodiments, probability module 306 may generate estimated probabilities for any number of network channels and dayparts. For example, probability module 306 may generate probabilities for a network channel and various dayparts (e.g., morning, afternoon, primetime), for another network channel and the various dayparts, etc.

Reach simulator 308 receives the estimated probabilities from probability module 306 and runs a simulation based on different numbers of spots to generate a projected reach of the content for media device(s) 106 of a household. As noted above, spots refer to the number of segments within linear content that are dedicated to the content whose reach is being estimated. For example, reach simulator 308 runs a simulation to test a range of spots (e.g., from zero to 200) that may be available in linear content that is being delivered to media device(s) 106. The output of the simulation may be a projected reach for each of the tested number of spots. One example of this calculation is reproduced below, although other methods may be used as long as the projected reach is based on (1) a number of spots within the linear content and (2) an estimated probability that is based on a ratio of impressions and the number of spots.

$$P(\text{reach}) = 1 - (1 - p_{household}^{network,daypart})^{spots}$$

Model trainer 310 is initiated after reach simulator 308 completes its simulation and generates the projected reach for each tested number of spots. Model trainer 310 may generate a model representative of the relationship between the projected reach and the number of spots that were provided as inputs to reach simulator 308.

FIG. 4A illustrates an exemplary output of a reach vs. spots model 400A, according to some embodiments. Data points 410 are outputs of reach simulator 308 and model trainer 310 may generate a model 400A reflecting the relationship between the projected reach and the number of spots. In some embodiments, model trainer 310 may generate a model for the projected reach and the number of spots for each network channel and daypart. Accordingly, there may be several models for each network channel and daypart with differing relationships between the expected spots and the GRPs.

In some embodiments, model trainer 310 may tune the simulation based on historical performance from prior linear content delivery schedules for content providers (e.g., advertisers) for a particular time period (e.g., quarter). Model trainer 310 may utilize ACR data from content recognition module 216 (or stored in metadata 124) to estimate a historical reach and the number of impressions of content providers for the particular time period, for each network channel and for each daypart.

After tuning, model trainer 310 may then translate the estimated historical reach by each advertiser to an expected number of spots for each network and day part. Model trainer 310 may further translate the estimated number of impressions (for each network and daypart) into GRPs. In some embodiments, GRPs are calculated by dividing the estimated number of impressions by the universe estimates for the particular region (e.g., U.S.) multiplied by 100. Model trainer 310 may then generate a spots vs. GRP model based on the translated values.

FIG. 4B illustrates an exemplary output of a spots vs. gross ratings points model, according to some embodiments. Data points 420 are outputs of the translation calculations and model trainer 310 may generate a model 400B reflecting the relationship between the expected number of spots and GRPs. In some embodiments, model trainer 310 may generate a model for each network channel and daypart. Accordingly, there may be a number of models for each network channel and daypart with differing relationships between the expected spots and the GRPs. Model 400B may be used to turn any GRPs value that is scheduled for a network channel and daypart into an average number of spots within the linear content that is needed to achieve the scheduled GRP.

Scheduling optimizer 312 may receive a delivery schedule 304 (e.g., GRP schedule), prepared for a content provider (e.g., advertiser), for a particular network channel and daypart. Scheduling optimizer 312 may then utilize model 400B to translate the delivery schedule 304 into a number of spots within linear content that are needed to achieve the desired reach for that content. In the example of a GRP schedule, scheduling optimizer 312 may translate the GRP schedule into a number of advertising spots within linear content for that particular network and daypart.

In embodiments involving a GRP schedule, scheduling optimizer 312 determines the relationship between the GRPs in the GRP schedule and the number of spots within linear content. For example, as the number of advertising spots within linear content increases, the potential for reaching a larger portion of the target audience also increases.

But there is a balance between reach and the number of spots. Ad fatigue may result if the frequency of exposure increases too much. Therefore, it is crucial to optimize the allocation of spots to maintain an optimal level of frequency without fatiguing the target audience. Scheduling optimizer 312 ensures the selection of spots for the desired GRP schedule will generate the desired household reach.

In some embodiments, scheduling optimizer 312 may provide the number of spots generated for the content schedule to reach simulator 308 to estimate a deduplicated reach for each network channel and daypart. This deduplication process ensures that media device(s) 106 of each household are only factored into the calculation once. For example, a household may be included in the audience of multiple network channels and day parts. To ensure that households are not double counted, the deduplication process may be run so that households are only counted once in calculating a reach for each schedule.

In some embodiments, an output of the scheduling optimizer 312 may include an optimized delivery schedule 320. Optimized delivery schedule 320 may include optimized number of spots to achieve the goals of delivery schedule 304. Optimized delivery schedule 320 may include a number of spots for a particular network channel and daypart. For example, optimized delivery schedule 320 may include optimized number of spots 326A for network channel 332A and daypart 334A, optimized numbers of spots 326B for network channel 3222 and daypart 334B, optimized numbers of spots 326C for network channel 332B and daypart 334A, and optimized numbers of spots 326D for network channel 332B and daypart 334B. The number of spots, network channels, and dayparts is merely exemplary and other variations are possible. Optimized number of spots 326 for network channel 332A and daypart 334A may be calculated based on model 400B and reflects the number of spots to achieve the desired reach of delivery schedule 304.

Figure 3B:
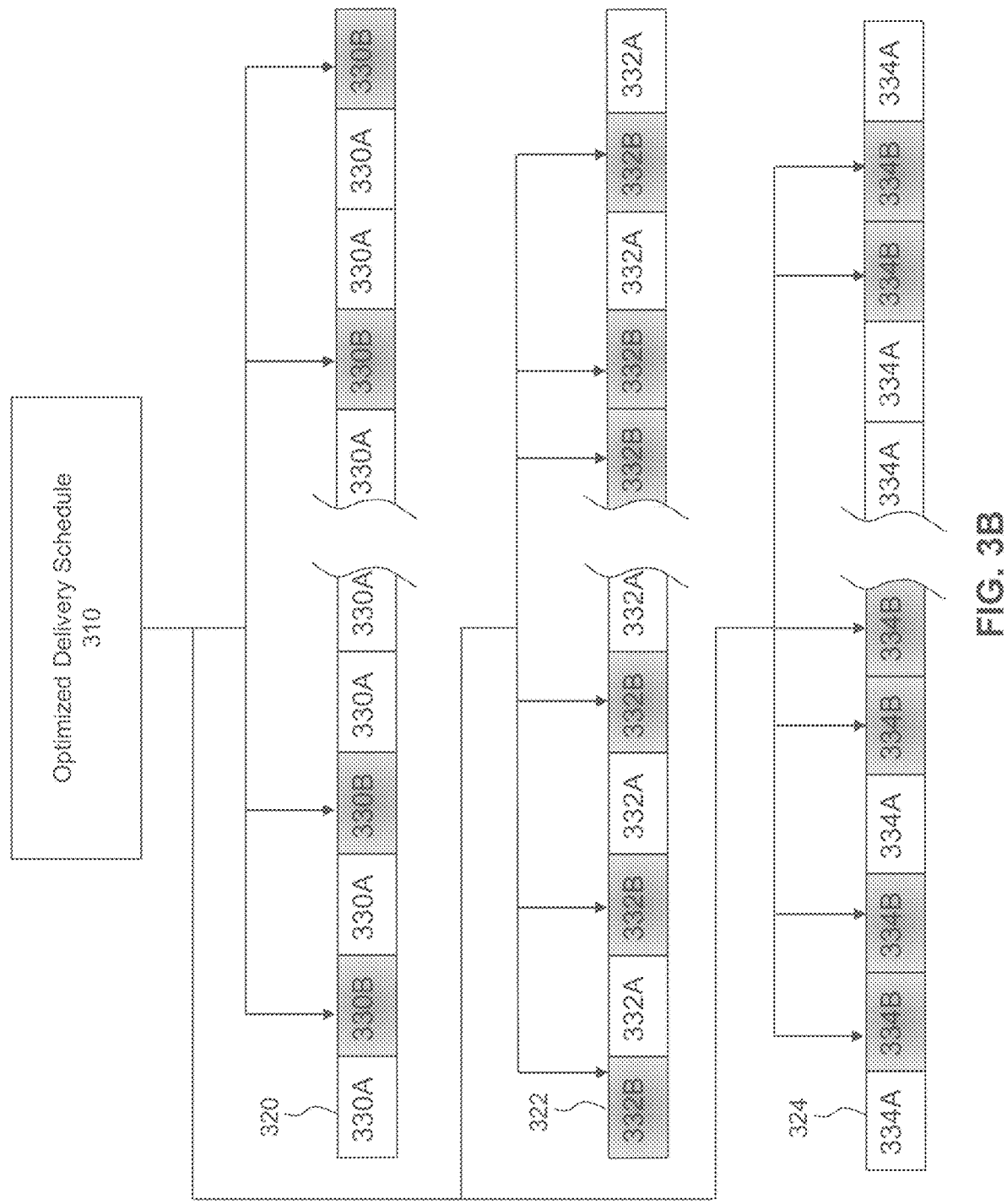
FIG. 3B illustrates an exemplary delivery schedule and an exemplary number of linear content delivery slots, according to some embodiments.

FIG. 3B illustrates an exemplary optimized delivery schedule 320 and an exemplary optimized number of linear content delivery slots, according to some embodiments. Optimized delivery schedule 320 may result in providing a number of different schedules for delivery linear content with a different number of slots for content for each network channel and daypart. For example, optimized delivery schedule 320 may provide a first schedule 320 of linear content for a network channel and a first daypart, a second schedule 322 of linear content for the same network channel and a second daypart, and a third schedule 324 of linear content for the same network channel and a third daypart. These are merely examples of delivery schedules, and other combinations of network channels and dayparts associated with the delivery schedules are possible.

Content spots, or slots, within a schedule may be allocated to different content, such as primary content and supplemental content. Linear reach forecaster 130 may be configured to estimate reach for the primary content, the supplemental content, or both. In some embodiments, linear reach forecaster 130 estimates reach for supplemental content, such as advertisements, and the number of spots in schedules 320, 322, and 324 may reflect the number of spots for advertisements within the linear content to achieve the desired GRP schedule for the advertiser.

First schedule 320 includes slots 330A for a first content type, such as primary content, and slots 330B for a second content type, such as supplemental content. In embodiments, where delivery schedule 304 is a GRP schedule, the number of slots 330B may be determined using model 400B where the GRP schedule indicates a desired GRP for the advertiser, the network channel, and the daypart.

Similarly, schedule 322 includes slots 332A for a first content type and slots 332B for a second content type, and schedule 324 includes slots 334A for a first content type and slots 334B for a second content type. In embodiments involving GRP schedules, the number of slots 332B and 334B may be determined using model 400B based on the advertiser, the network channel, and the daypart. The number of slots for advertisements for each schedule may be different for each network channel and daypart. In this manner, optimized delivery schedule 320 provides an optimized number of spots to achieve the desired reach for each network channel and daypart Reach Estimation and Schedule Optimization FIG. 5 is a flowchart illustrating a reach estimation and schedule optimization method 500 for estimating the reach of a proposed content schedule (e.g., that includes a target audience and GRPs) and adjusting the schedule in accordance with the estimated reach, according to some embodiments. Method 500 can be performed by processing logic that can comprise hardware (e.g., circuitry, dedicated logic, programmable logic, microcode, etc.), software (e.g., instructions executing on a processing device), or a combination thereof. As a non-limiting example of FIGS. 1-3, one or more functions described with respect to FIG. 5 may be performed by a server (e.g., system server 126), a media device (e.g., media device 106 of FIG. 1) or a display device (e.g., display device 108 of FIG. 1). In such an embodiment, any of these components may execute code in memory to perform certain steps of reach estimation and schedule optimization method 500 of FIG. 5. While reach estimation and schedule optimization method 500 of FIG. 5 will be discussed below as being performed by certain components of multimedia environment 102, other components may store the code and therefore may execute reach estimation and schedule optimization method 500 by directly executing the code. Accordingly, the following discussion of reach estimation and schedule optimization method 500 will refer to components of FIGS. 1, 2, and 3 as an exemplary non-limiting embodiment. Moreover, it is to be appreciated that not all steps may be needed to perform the disclosure provided herein. Further, some of the functions may be performed simultaneously, in a different order, or by the same components than shown in FIG. 5, as will be understood by a person of ordinary skill in the art. The following steps are discussed with respect to linear reach forecaster 130 but one or more of the steps may be performed by linear reach forecaster 218 in combination with or instead of linear reach forecaster 130.

In step 502, linear reach forecaster 130 may estimate one or more probabilities of exposing content to media device(s) 106 of household on a particular network channel and daypart. In some embodiments, probabilities may be based on the amount of content that is delivered to one or more media devices of a household. Examples of content include primary content, supplemental content, or a combination of both. For example, amount of content can include the number of spots of linear ads that was delivered to one or more media devices. A probability may be based on a ratio of the accumulated exposures over a maximum number of spots that were available for a network in a daypart. In some embodiments, the maximum number of spots may be estimated based on an average content load (e.g., advertisement load) per hour of linear content.

In step 504, linear reach forecaster 130 may run a reach simulation based on the estimated probabilities. Linear reach forecaster 130 may run a simulation for a range of spots to determine if one or more media devices of a household would receive and display the content (i.e., the reach of the content). In some embodiments, the estimated reach of the content is based on the one or more probabilities calculated in 502 for each number of spots within a range of spots (e.g., from 0 to 200). Linear reach forecaster 130 may generate the reach simulation for each network and daypart resulting in generating multiple estimated reaches for the network, daypart, and number of spots.

In step 506, linear reach forecaster 130 generates a reach model reflecting the relationship between the estimated reaches and the number of spots associated with each network channel and daypart. The model may reflect the relationship between the estimated reaches from 504 and the number of spots for each network and daypart. The model may be used to convert the estimated reach into an estimated number of spots.

In some embodiments, steps 508-512 are implemented based on estimating the reach of supplemental content, such as advertisements.

In step 508, linear reach forecaster 130 may build a relationship between the number of spots provided by the model generated in step 506, and GRPs. Linear reach forecaster 130 may tune the reach simulation based on historical performance from advertisers running linear campaigns during a predetermined time period. In some embodiments, historical performance data may be based on automatic content recognition (ACR) of content that is displayed on the one or more media devices of households. ACR may be used to detect linear content being delivered to and displayed by the one or more media devices. ACR may be used to generate an ACR data footprint of linear content at each household. In some embodiments, the ACR data footprint includes the number of impressions of content for the one or more devices at each household for each network channel and daypart.

In some embodiments, after the simulation is tuned, linear reach forecaster 130 may translate the observed reach by each advertiser to an estimated number of spots using the tuned reach model. The number of impressions may also be translated into GRPs which, in some embodiments, can be determined based on a ratio of impressions and the universe of viewers within a predetermined region. The result of 508 is a relationship between the spots and GRPs for each advertiser, network channel, and daypart.

In step 510, linear reach forecaster 130 may determine an estimated number of spots for a received GRP schedule for each advertiser at each network channel and daypart. In some embodiments, linear reach forecaster 130 may generate a spots model that encapsulates the relationship between the GRPs and the estimated number of spots. The model may be used to turn any GRP value that is provided within a content schedule, such as a GRP schedule, into an optimized number of spots. The model determines the optimized number of spots based on the determining the GRPs from the GRP schedule.

In step 512, linear reach forecaster 130 may adjust the received GRP schedule which impacts the number of spots to generate an optimized linear content schedule. Linear reach forecaster 130 may generate a predicted or estimated reach based on the number of spots and day parts. In some embodiments, linear reach forecaster 130 may generate the optimized linear content schedule based on the number of spots by allocating that number of spots within the optimized linear content schedule. The predicted reach provided by linear reach forecaster 130 may reflect the estimated number of people that will be exposed to content based on a provided content schedule, which may include the target audience and the GRPs.

As noted above, in embodiments involving optimization, linear reach forecaster 130 may then utilize the predicted reach to generate an optimized linear content schedule. Linear content may then be delivered in accordance with the optimized linear content schedule. In some embodiments, the linear content in the linear content schedule may include advertisements within each spot of the number of spots. After generated, linear content may then be delivered to one or more devices of each household to be displayed at the corresponding network channel and daypart based on the optimized linear content schedule. Content may then be delivered based on the optimized linear content schedule, where delivery of the content approximates the estimated reach that can be achieved based on the provided GRPs.

Example Computer System

Figure 6:
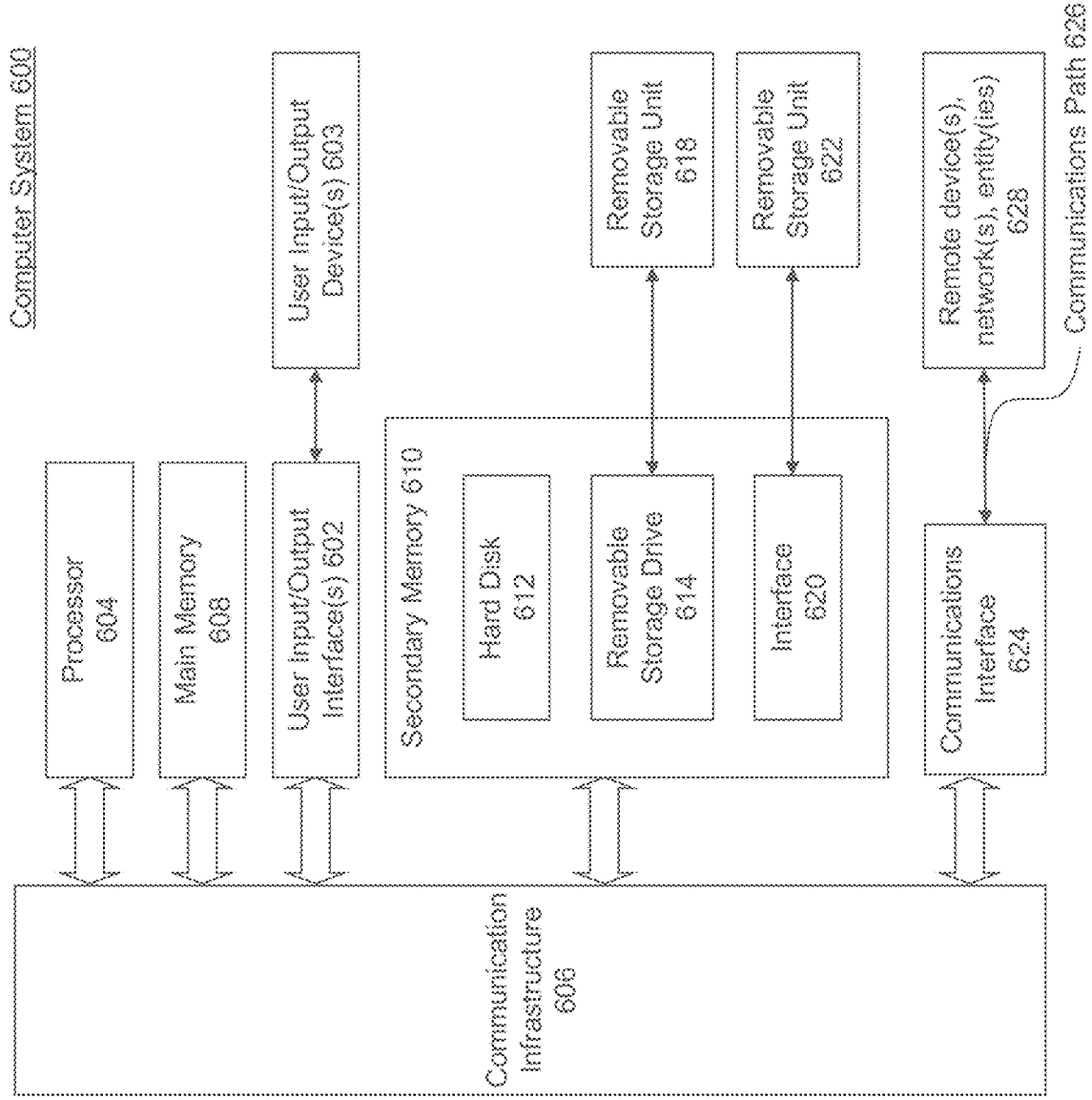
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for determining an optimized content schedule, comprising:
    inputting a content schedule into a relationship model, wherein the content schedule is associated with linear content, wherein the linear content is to be delivered to a media device associated with a household, wherein the content schedule comprises a target impression for supplemental content within the linear content, wherein the content schedule is further associated with a content provider, a network channel, and a daypart, and wherein the target impression reflects a number of desired impressions of the supplemental content within the linear content;
    outputting, by the relationship model, a number of delivery slots for the target impression, the network channel, and the daypart;
    generating an estimated reach based on the number of delivery slots, the network channel, and the daypart;
    generating an optimized linear content schedule based on the estimated reach and the content schedule; and
    delivering the linear content via the network channel to the media device associated with the household based on the optimized linear content schedule.

2. The computer-implemented method of claim 1, wherein the optimized linear content schedule comprises a gross ratings points (GRP) schedule.

3. The computer-implemented method of claim 1, wherein the content provider is an advertiser and the supplemental content is advertising content.

4. The computer-implemented method of claim 1, wherein generating the linear content further comprises:
identifying slots in the linear content corresponding to the number of delivery slots; and
inserting the supplemental content in the identified slots.

5. The computer-implemented method of claim 1, wherein the generating the estimated reach comprises the steps of:
estimating a reach probability of the supplemental content for the network channel and the daypart based on historical performance data associated with the network channel and the daypart;
generating the estimated reach of the supplemental content based on the reach probability and a range of spots available for the network channel and the daypart;
generating a reach model reflecting a relationship between the estimated reach of the supplemental content and the range of spots; and
determining the number of delivery slots for the target impression, the network channel, and the daypart, based on the relationship between the estimated reach of the supplemental content and the range of spots.

6. The computer-implemented method of claim 5, wherein the reach probability is calculated based on a ratio:

$$p_{household}^{network,daypart} = \frac{\text{impressions}_{household}^{network,daypart}}{\text{spots}_{max}^{network,daypart}}$$

where $p_{household}^{network,\ daypart}$ reflects the reach probability, $\text{impressions}_{household}^{network,\ daypart}$ represents a number of exposures to the supplemental content by the household for the network channel and the daypart, and $\text{spots}_{max}^{network,\ daypart}$ represents a maximum number of spots available for the network channel in the daypart.

7. The computer-implemented method of claim 1, further comprising:
adjusting the optimized linear content schedule based on the number of delivery slots.

8. A media device, comprising:
at least one memory; and
at least one processor coupled to the at least one memory and configured to perform operations comprising:
inputting a content schedule into a relationship model, wherein the content schedule is associated with linear content, wherein the linear content is to be delivered to a media device associated with a household, wherein the content schedule comprises a target impression for supplemental content within the linear content, wherein the content schedule is further associated with a content provider, a network channel, and a daypart, and wherein the target impression reflects a number of desired impressions of the supplemental content within the linear content;
outputting, by the relationship model, a number of delivery slots for the target impression, the network channel, and the daypart;
generating an estimated reach based on the number of delivery slots, the network channel, and the daypart;
generating an optimized linear content schedule based on the estimated reach and the content schedule; and
delivering the linear content via the network channel to the media device associated with the household based on the optimized linear content schedule.

9. The media device of claim 8, wherein the optimized linear content schedule comprises a gross ratings points (GRP) schedule.

10. The media device of claim 8, wherein the content provider is an advertiser and the supplemental content is advertising content.

11. The media device of claim 8, wherein to generate the linear content, the at least one processor is further configured to:
identify slots in the linear content corresponding to the number of delivery slots; and
insert the supplemental content in the identified slots.

12. The media device of claim 8, wherein to generate the estimated reach, the at least one processor is further configured to:
estimate a reach probability of the supplemental content for the network channel and the daypart based on historical performance data associated with the network channel and the daypart;
generate the estimated reach of the supplemental content based on the reach probability and a range of spots available for the network channel and the daypart;
generate a reach model reflecting a relationship between the estimated reach of the supplemental content and the range of spots; and
determine the number of delivery slots for the target impression, the network channel, and the daypart, based on the relationship between the estimated reach of the supplemental content and the range of spots.

13. The media device of claim 12, wherein the reach probability is calculated based on a ratio:

$$p_{household}^{network,daypart} = \frac{\text{impressions}_{household}^{network,daypart}}{\text{spots}_{max}^{network,daypart}}$$

where $p_{household}^{network,\ daypart}$ reflects the reach probability, $\text{impressions}_{household}^{network,\ daypart}$ represents a number of exposures to the supplemental content by the household for the network channel and the daypart, and $\text{spots}_{max}^{network,\ daypart}$ represents a maximum number of spots available for the network channel in the daypart.

14. The media device of claim 8, wherein the at least one processor is further configured to adjust the optimized linear content schedule based on the number of delivery slots.

15. A non-transitory computer-readable medium having instructions stored thereon that, when executed by at least one computing device, cause the at least one computing device to perform operations comprising:
inputting a content schedule into a relationship model, wherein the content schedule is associated with linear content, wherein the linear content is to be delivered to a media device associated with a household, wherein the content schedule comprises a target impression for supplemental content within the linear content, wherein the content schedule is further associated with a content provider, a network channel, and a daypart, and wherein the target impression reflects a number of desired impressions of the supplemental content within the linear content;

outputting, by the relationship model, a number of delivery slots for the target impression, the network channel, and the daypart;

generating an estimated reach based on the number of delivery slots, the network channel, and the daypart;

generating an optimized linear content schedule based on the estimated reach and the content schedule; and delivering the linear content via the network channel to the media device associated with the household based on the optimized linear content schedule.

16. The non-transitory computer-readable medium of claim 15, wherein the content schedule comprises a gross ratings points (GRP) schedule.

17. The non-transitory computer-readable medium of claim 15, wherein the content provider is an advertiser and the supplemental content is advertising content.

18. The non-transitory computer-readable medium of claim 15, wherein generating the linear content further comprises:

identifying slots in the linear content corresponding to the number of delivery slots; and inserting the supplemental content in the identified slots.

19. The non-transitory computer-readable medium of claim 15, wherein generating the estimated reach comprises:

estimating a reach probability of the supplemental content for the network channel and the daypart based on historical performance data associated with the network channel and the daypart;

generating an estimated reach of the supplemental content based on the reach probability and a range of spots available for the network channel and the daypart;

generating a reach model reflecting a relationship between the estimated reach of the supplemental content and the range of spots; and determining the number of delivery slots for the target impression, the network channel, and the daypart, based on the relationship between the estimated reach of the supplemental content and the range of spots.

20. The non-transitory computer-readable medium of claim 19, wherein the reach probability is calculated based on a ratio:

$$p_{household}^{network,daypart} = \frac{\text{impressions}_{household}^{network,daypart}}{\text{spots}_{max}^{network,daypart}}$$

where $p_{household}^{network,\,daypart}$ reflects the reach probability, $\text{impressions}_{household}^{network,\,daypart}$ represents a number of exposures to the supplemental content by the household for the network channel and the daypart, and $\text{spots}_{max}^{network,\,daypart}$ represents a maximum number of spots available for the network channel in the daypart.

* * * * *